P. H. THOMAS.
SYSTEM OF ELECTRICAL DISTRIBUTION.
APPLICATION FILED SEPT. 9, 1908.
1,110,596.
Patented Sept. 15, 1914.
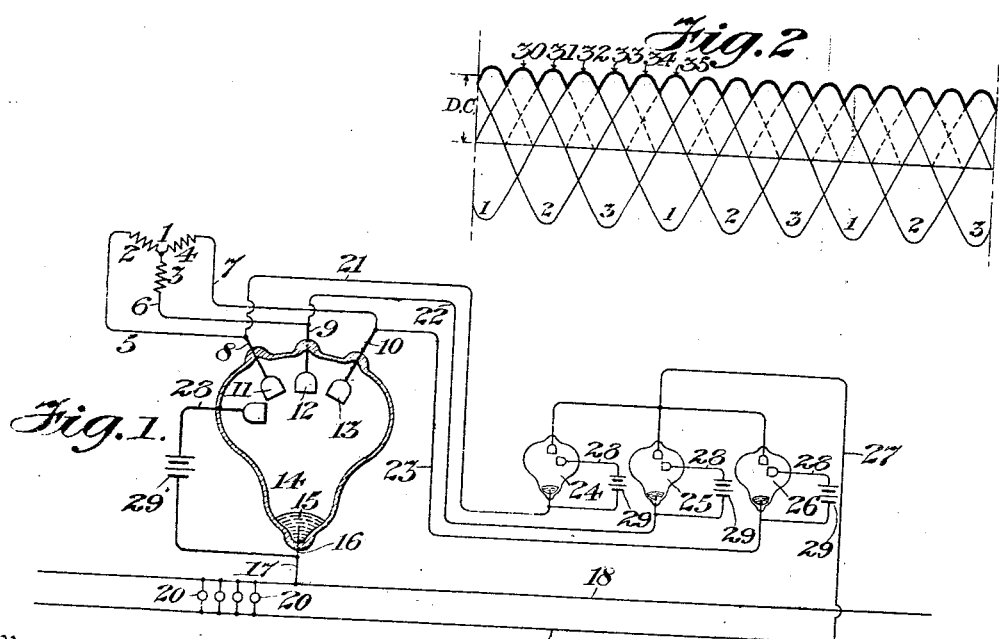

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

SYSTEM OF ELECTRICAL DISTRIBUTION.

1,110,596.   Specification of Letters Patent.   Patented Sept. 15, 1914.

Original application filed January 21, 1903, Serial No. 139,875. Renewed February 21, 1907, Serial No. 358,727. Divided and this application filed September 9, 1908. Serial No. 452,241.

*To all whom it may concern:*

Be it known that I, PERCY H. THOMAS, a citizen of the United States, and resident of Montclair, county of Essex, State of New Jersey, have invented certain new and useful Improvements in Systems of Electrical Distribution, of which the following is a specification.

My invention relates to certain improvements in organizations of apparatus for obtaining a flow of current in a given direction from sources of alternating electric currents.

In certain patents issued to Peter Cooper Hewitt on the 17th day of September, 1901, there are described forms of apparatus which permit the passage of electric currents in a given direction while opposing a material resistance to flow of current in the opposite direction.

My invention aims to utilize this phenomenon in a system of electrical distribution.

In Figure 1 of the accompanying drawings, I have illustrated in diagram an apparatus for carrying out the invention; and Fig. 2 is a diagram showing the time curves of the electro-motive-force relations.

Referring to Fig. 1 of the drawings, 1 represents a suitable source of alternating current, in this instance a three-phase generator. The coils 2, 3 and 4, of the generator are, respectively, connected with conductors, 5, 6 and 7. These conductors are carried, respectively, to lead-wires, 8, 9 and 10, leading to positive electrodes, 11, 12 and 13, inside the container, 14, of a vapor apparatus having a negative electrode, 15. The latter is joined through its lead-wire, 16, and a conductor, 17, to one main, 18, of a work circuit, the opposite main of which is shown at 19. The work circuit contains translating devices, 20, 20, which may be any devices adapted to be operated upon a current of uniform direction. The electrodes, 11, 12 and 13 may conveniently be of iron, copper or mercury, while the electrode 15 may consist of a small quantity of mercury. The conductors, 5, 6 and 7 are, respectively, connected to branches, 21, 22 and 23, leading to the mercury of negative electrodes, respectively, of vapor devices, 24, 25 and 26. These devices are provided with positive electrodes which are all connected together, the connecting wire being joined by a conductor, 27, with the main 19 of the work circuit.

Each of the devices 24, 25 and 26 may be provided with a supplemental electrode, 28, connected with the positive terminal of a source of direct current, 29, the opposite terminal of which is connected with the corresponding terminal, 30, connected with the negative electrode of the same device. The vapor device, 14, may be similarly provided with means for keeping the device alive, that is to say, maintaining a continuous flow of current in one direction therethrough.

In operating the device there is initially a reluctance to starting which may be overcome in any convenient manner, as for instance, by some of the methods described in the Hewitt patents before referred to, or in any other convenient way, and this resistance having been once overcome will remain overcome as long as the current continues to flow in the same direction. Such flow may be obtained in the present instance from the direct current source 29, referred to, or from any other suitable source of electro-motive-force which may be called upon to deliver currents or impulses in the proper direction at the proper time.

In the operation of the apparatus, each positive wave of the electro-motive-force from the generator 1 will traverse the vapor device 14 thus reaching the work circuit and will find a return circuit through one or more of the devices 24, 25 and 26. Similarly, each negative wave will reach the opposite side of the work circuit through one or more of the vapor devices 24, 25 and 26, and return through the device 14. The resulting flow of current through the work circuit is always in the same direction.

When a source of alternating currents is mentioned, it may be understood to mean either an alternating generator or a transformer or equivalent device constituting the feeder for the supply circuit.

It will be observed by reference to Fig. 2 that the resulting flow of energy in the work circuit is much more constant than would result if only the waves in a given direction were effectively employed. It has heretofore been proposed to connect the return circuit with a neutral point of the source and use only the electro-motive-force in one direction. By reference to Fig. 2, it will be seen that the resulting flow of energy will be more or less pulsating, due to the rise and fall of the electro-motive-force applied to one device before the succeeding wave is transmitted through the successive device.

In the diagram Fig. 2, the curves marked 30, 32, 34, would represent diagrammatically the flow of energy if the positive impulses alone were employed, whereas when the negative impulses are also employed the flow of energy due to the negative impulses is represented by the curves 31, 33 and 35, so that the resulting flow of energy will be represented by the configuration of the upper curve of Fig. 2. This for convenience is represented in the diagram by the heavy lines.

The operation may be described more in detail as follows: Starting at a certain instant, current will flow from the winding 3 through the lead 6 and the electrode 12 to the work circuit and back through the lead 27, the device 26, to the winding 4. This will continue for one-sixth of a cycle. Current flows between these two coils because the electro-motive-force between their terminals is the highest positively directed electro-motive-force during this period. At the end of the sixty degrees the electro-motive-force between the winding 3 and the winding 2 becomes greater than that between the winding 3 and the winding 4 and is in the positive direction so that the current flowing from the winding 3 through the electrode 12 instead of returning from the work circuit by the device 26 to the winding 4, returns through the device 24 to the winding 2. This continues for sixty degrees or the second one-sixth of a cycle. At the end of this time the potential between the winding 4 and the winding 2 is positive in direction and becomes greater in amount than that between the winding 3 and the winding 2. Consequently, current at this moment begins to flow from the winding 4 through the lead 7, the electrode 13, to the work circuit and back through the device 24 to the winding 2. Similarly at periods of sixty degrees or one-sixth of a cycle, current will change first from the winding 2 to the winding 3 in returning from the work circuit, from the winding 4 to the winding 2 in its passage to the work circuit, from the winding 3 to the winding 4 in returning, and from the winding 2 to the winding 3 in passing to the work circuit, thus completing the cycle and reaching the initial starting point. It will thus be seen that six impulses pass through the work circuit during a single cycle as shown in Fig. 2.

It will be understood that the diagram indicating the time curves of the electro-motive-force is theoretical and that the relative positions and relations of the waves may be more or less modified by inductive and other effects. It will also be understood that the arrangement herein shown and described is applicable to supply circuits of any number of phases, and also to a plurality of supply circuits, either in or out of synchronism.

It has been convenient to describe the system of distribution herein disclosed as embodying, among its principal features, a gas or vapor electrical apparatus of the general character of the Cooper Hewitt lamp. It will be understood that this device has been selected for purposes of illustration, and that the invention, broadly, is not limited to the employment of a device of that specific character.

It is found convenient to designate those gas or vapor electric devices which are connected to the positive side of the work circuit as "positively connected" devices and those devices connected to the negative side of the work circuit as "negatively connected" devices.

This application is a division of an application filed by me January 21, 1903, Serial Number 139,875; renewed February 21, 1907, Serial Number 358,727.

I claim as my invention:

In a gas or vapor electric device comprising a suitable container, a plurality of electrodes acting as anodes therein, a vaporizable electrode acting as cathode therein, a supplementary electrode nearer said cathode than the main anodes, the space including said electrodes being completely exhausted.

Signed at New York in the county of New York and State of New York this 8th day of September A. D. 1908.

PERCY H. THOMAS.

Witnesses:
Wm. H. Capel,
George H. Stockbridge.